3,291,765
PROCESS FOR PRODUCING OIL-MODIFIED ALKYD RESINS AND SUCH RESINS

Philip J. Campagna, Somerville, N.J., assignor to Allied Chemical Corporation, New York, N.Y., a corporation of New York
No Drawing. Filed Mar. 19, 1962, Ser. No. 180,872
7 Claims. (Cl. 260—22)

The present invention relates to the production of oil-modified alkyd resins and to such resins.

The production of oil-modified alkyd resins by incorporating partially epoxidized fatty acid oils, such as soyabean oil, into the alkyd reaction mixture during the final stages of processing of the alkyd, has been proposed. Another proposal is to mix the partially epoxized fatty acid oil with the unsaturated dicarboxylic acid, and glycol, with or without a saturated dicarboxylic acid and react these constituents at temperatures between 180° C. and 200° C. to produce the alkyd or polyester resin. These procedures are objectionable for a number of reasons among which may be mentioned that they require relatively long reaction periods, frequently more than 24 hours, do not result in alkyd resins having the desired properties, particularly good bonding properties, and are wasteful of reactants. The second mentioned procedure is objectionable for the further reason that it involves the danger of gelation taking place during the course of the reaction with consequent undesirable increase in the viscosity characteristics of the resin product.

It is among the objects of the present invention to provide a novel process of producing an oil-modified alkyd resin, which process beneficially utilizes the reactants more effectively than heretofore known procedures in producing the final product, and results in alkyds of desirable properties useful as the resinous vehicles of coating compositions and for other purposes.

Another object of this invention is to provide a novel class of oil-modified alkyd resins.

These and other objects of this invention will be apparent from the following detailed description of the invention.

In accordance with this invention an ester of an olefinic higher aliphatic acid, or mixture of such esters, is mixed with phthalic anhydride and hydrogen peroxide in the molar proportions of 1 mol of ester (or mixture of esters), from 1.5 to 2 mols of phthalic anhydride, and from 1.25 to 1.75 mols of hydrogen peroxide, and the mixture reacted at from 30° C. to 80° C., preferably 40° C. to 60° C., to effect the in situ epoxidation of the ester. In the course of this reaction the phthalic anhydride is converted to perphthalic acid which reacts with the ester to effect the in situ epoxidation thereof and form phthalic acid. This formation of perphthalic acid and of phthalic acid therefrom continues until substantially all of the hydrogen peroxide is used up. Usually the reaction proceeds until at least about 85% of the original hydrogen peroxide is consumed. It is important to employ an amount of hydrogen peroxide in excess of about one mol of hydrogen peroxide per mol of ester. Operating under these conditions an epoxidized ester is produced which when reacted with the phthalic acid and polyhydric alcohol aids in imparting to the resultant alkyd resin desirable properties, for example, reasonably good color, low acid numbers, usually below 10, and relatively fast drying properties. A reaction time of from 3 to 4 hours suffices to carry out the epoxidation reaction. After the completion of the in situ epoxidation the reaction mixture is heated to above the boiling point of water to drive off the water and any unreacted hydrogen peroxide. The epoxidized reaction mixture can be heated to a temperature of from about 100° C. to 110° C. for a period of time sufficient to effect removal of substantially all water; usually one-half hour of heating will suffice. The rate of heating should be such as to avoid excessive foaming.

To the resultant reaction mixture is then added the polyhydric alcohol which can be glycerol, pentaerythritol-ethylene glycol, propylene glycol, trimethylol propane or trimethylol ethane in amount of about one mol of the polyhydric alcohol per 3.5 to 4.5 mols of the reaction mixture. Reaction is continued at a temperature of from 225° C. to 250° C., preferably 235° C. to 240° C., until the desired oil-modified alkyd resin results. This is usually effected in from 3 to 4 hours.

By following this procedure the excess of phthalic anhydride introduced into the initial reaction mixture and the phthalic acid formed and remaining in the reaction mixture when the polyhydric alcohol is added is not wasted, but the phthalic anhydride is converted to phthalic acid and all or substantially all phthalic acid present reacts with the polyhydric alcohol and epoxidized ester in the formation of the alkyd resin. Alkyd resins having reasonably good color and relatively low acid numbers, usually below 10, are thus obtained. The color of the resin is formed about 8 to 13 on the known Hellige comparator. Oil-modified alkyd resins have been produced, which, when dissolved in suitable solvents such as mineral spirits, produce films which are clear, glossy and water-white. Moreover, the reaction time for the complete process need not exceed from 8 to 10 hours, and can be as little as 6 hours.

Any of the available esters of olefinic higher aliphatic acids or mixtures thereof can be used, preferably esters of higher aliphatic acids in which the aliphatic chain contains from 16 to 18 carbon atoms. Examples of such esters are soyabean oil, linseed oil, castor oil, perilla oil, fish oil, safflower oil, hempseed oil, sunflower oil, tung oil, and oiticica oil. It is preferred to use a refined grade of oil, for example, an oil produced by treatment with alkali in accordance with conventional alkali refining procedures, although commercially available grades of these oils can be used if desired.

The preferred molar ratio of oil to phthalic anhydride to hydrogen peroxide in the initial reaction mixture is 1 to 1.78 to 1.38 but these reactant proportions can be varied within the ranges hereinabove disclosed. The oil and phthalic anhydride are mixed first, heated to a temperature of from 30° C. to 60° C., preferably about 40° C., and while the mixture is maintained at this temperature the hydrogen peroxide added slowly. Hydrogen peroxide of any available concentration can be used; hydrogen peroxide of about 50% concentration is preferred because it is readily available and safer than the more concentrated hydrogen peroxide. After all of the hydrogen peroxide is added the temperature is permitted to rise to about 50° C. to 70° C., preferably about 60° C.; the reaction is exothermic and cooling is employed to maintain the reaction mixture at the desired temperature.

The temperature is maintained at about 50° C. to 80° C. for about two hours and then increased to abou 90° C. to 125° C., preferably 100° C. to 110° C. and maintained at about this level for one-half to one hour to drive off the water and remove any unreacted hydrogen peroxide. As indicated, the heating should be conducted to avoid excessive foaming. The polyhydric alcohol is then added and the temperature increased slowly to 225° C. to 250° C., preferably 235° C. to 240° C., and the reaction maintained at this temperature until alkyd resins result having the desired acid number. Heating for about 2 to 4 hours is usually sufficient to produce alkyd resins having the desired properties.

The following examples are given to illustrate the preferred embodiments of this invention. It will be appreciated the invention is not limited to these examples.

*Example I*

To a stirred mixture of 400 parts (0.445 mol) soyabean oil and 90 parts (0.610 mol) of phthalic anhydride heated to 40° C., was added dropwise 41.9 parts (0.615 mol) of a 50% aqueous hydrogen peroxide solution over a period of one hour while allowing the temperature to rise to 60° C. The temperature was maintained at 60° C. by cooling until addition of all the hydrogen peroxide and for an additional two hours thereafter. Analysis of a sample of the reaction mixture at this point indicated that 11.4% of the original hydrogen peroxide remained in the reaction mixture and that 88.6% of this hydrogen peroxide had reacted. The temperature was increased to 100° C. and maintained at temperatures of from 100° C. to 110° C. for one-half hour to drive off the water and unreacted hydrogen peroxide. To this mixture was added 27.9 parts (0.305 mol) of glycerol and the temperature increased slowly to 235–240° C. and maintained at this temperature until an acid number (mg. of KOH/g. resin) of 7.5 was obtained. The reaction took 3 hours.

A 70% solution of the resin was made in mineral spirits, boiling range 178° C. to 198° C. The solution had a viscosity of X by the Gardner-bubble viscometer, which corresponds to a viscosity of 1290 in centipoises. The solution had a color of 13 (Hellige comparator).

*Example II*

400 parts (0.445 mol) of linseed oil and 117 parts (0.79 mol) phthalic anhydride were heated to 400° C. 41.9 parts (0.615 mol) of a 50% aqueous hydrogen peroxide solution was added to this mixture over a period of one hour while allowing the temperature to rise, due to the heat liberated in the reaction, to 60° C. The reaction mixture was maintained at 60° C. throughout the addition of the hydrogen peroxide and at 50° C. to 60° C. for an additional two hours by cooling the reaction mixture. At the end of the two-hour period analysis of a sample of the reaction mixture showed that 1.6% of the original hydrogen peroxide remained in the mixture and that 96.84% had reacted. The mixture was heated to 100° C. to 110° C. for one-half hour to drive off the water. To the resultant mixture was added 39.1 parts (0.425 mol) of glycerol. The temperature was increased to 235° C. to 240° C. and the reaction mixture maintained at this temperature for 3 to 4 hours. An alkyd resin having an acid number (mg. KOH/g. resin) of 9.6 was obtained. This resin was dissolved in mineral spirits, boiling range 178° C. to 198° C., to produce a 50% solution. The solution had a viscosity of U (Gardner-bubble viscometer) which corresponds to a viscosity of 620 in centipoises. A solution containing 0.03% cobalt and 0.30% lead based on the weight of the resin, as cobalt and lead naphthenates when cast on a glass plate with a 3 mil doctor blade air dried in 4 hours. The films were clear, glossy and water-white.

The substitution of the polyhydric alcohols, pentaerythritol-ethylene glycol, propylene glycol, trimethylol propane, or trimethylol ethane for the glycerol in the above examples resulted in oil-modified alkyd resins useful as the resinous vehicle in the production of coatings.

It will be noted that the present invention provides a novel process of producing an oil-modified alkyl resin, which process beneficially utilizes the reactants more effectively than heretofore known procedures and results in alkyds having good color, low acid number, and relatively fast air drying properties, eminently satisfactory for use as the resin vehicles for coating compositions and for other purposes. The resultant oil-modified alkyds represent a novel class of such resins.

Since certain changes in carrying out the above process of producing oil-modified alkyd resins and in the alkyd resins which embody this invention can be made without departing from the scope of this invention, it is intended that all matter contained in this description shall be interpreted as illustrative and not in a limiting sense.

What is claimed is:

1. The process of producing an oil-modified alkyd resin which consists essentially of mixing an ester of an olefinic higher aliphatic acid with phthalic anhydride and hydrogen peroxide in the proportions of from 1.5 to 2 mols of phthalic anhydride and 1.25 to 1.75 mols of hydrogen peroxide per mol of ester, maintaining the reaction mixture at a temperature to effect epoxidation of the ester, adding a polyhydric alcohol to the reaction mixture in amount to produce a reaction mixture containing from about 3.5 to 4.5 mols of reaction mixture per mol of polyhydric alcohol, and heating the resultant reaction mixture to produce an oil-modified alkyd resin having an acid number less than 10.

2. The process of producing an oil-modified alkyd resin which consists essentially of mixing an ester of an olefinic higher aliphatic acid, phthalic anhydride and hydrogen peroxide in the proportions of 1.5 to 2 mols of phthalic anhydride and 1.25 to 1.75 mols of hydrogen peroxide per mol of ester, maintaining the reaction mixture at a temperature within the range of from 30° C. to 80° C. until at least about 85% of the hydrogen peroxide has reacted, thereafter heating the reaction mixture to a temperature above the boiling point of water to drive off unreacted hydrogen peroxide and water, then adding a polyhydric alcohol to the resultant mixture in amount of about 3.5 to 4.5 mols of reaction mixture per mol of polyhydric alcohol, and heating the resultant reaction mixture to a temperature within the range of from 225° C. to 250° C. until the desired oil-modified alkyd resin having an acid number less than 10 results.

3. The process of producing an oil-modified alkyd resin which consists essentially of mixing an ester of an olefinic higher aliphatic acid having from 16 to 18 carbon atoms, phthalic anhydride and hydrogen peroxide in the proportions of about 1.78 mols of phthalic anhydride and 1.38 mols of hydrogen peroxide per mol of ester, maintaining the reaction mixture at a temperature within the range of from 30° C. to 80° C. until at least about 85% of the hydrogen peroxide has reacted, thereafter heating the reaction mixture to a temperature above the boiling point of water to drive off unreacted hydrogen peroxide and water, then adding a polyhydric alcohol to the resultant reactant mixture in amount of about 3.9 mols of reaction mixture per mol of polyhydric alcohol, and heating the resultant reaction mixture to a temperature within the range of from 225° C. to 250° C. until the desired oil-modified alkyd resin having an acid number less than 10 results.

4. The process of claim 3, in which the ester is soyabean oil and the polyhydric alcohol is glycerol.

5. The process of claim 3, in which the ester is linseed oil and the polyhydric alcohol is glycerol.

6. An oil-modified alkyd resin produced by the process of claim 1.

7. An oil-modified alkyd resin produced by the process of claim 2.

References Cited by the Examiner

UNITED STATES PATENTS

| | | | |
|---|---|---|---|
| 1,888,849 | 11/1932 | Dawson | 260—22 |
| 2,873,283 | 2/1959 | Yang | 260—348.5 |
| 2,903,465 | 9/1959 | Suter et al. | 260—348.5 |
| 3,066,159 | 11/1962 | De Groote et al. | 260—406 |
| 3,120,547 | 2/1964 | Dieckelmann | 260—348.5 |

FOREIGN PATENTS 804,537  11/1958  Great Britain.

OTHER REFERENCES

"Chemical Reviews" (Swern), vol. 45, pages 1–68 (1949).

LEON J. BERCOVITZ, *Primary Examiner.*

ALPHONSO D. SULLIVAN, J. W. BEHRINGER, R. W. GRIFFIN, *Assistant Examiners.*